Jan. 28, 1969  F. FREUDENSTEIN  3,424,021
INTERMITTENT MOTION MECHANISM EMPLOYING NON-CIRCULAR GEARS
Filed May 23, 1967  Sheet 1 of 3
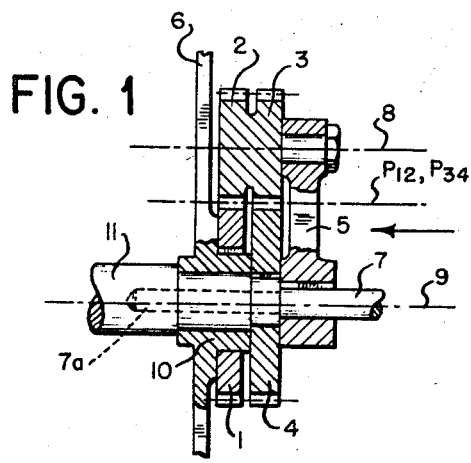
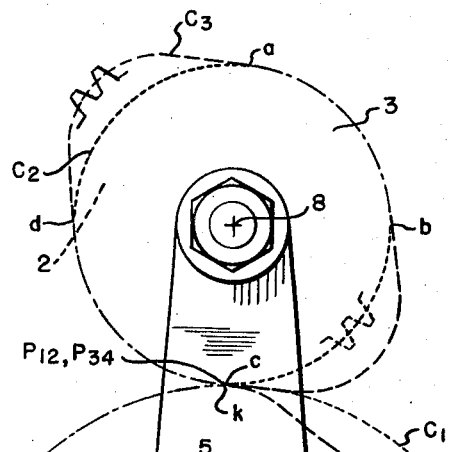
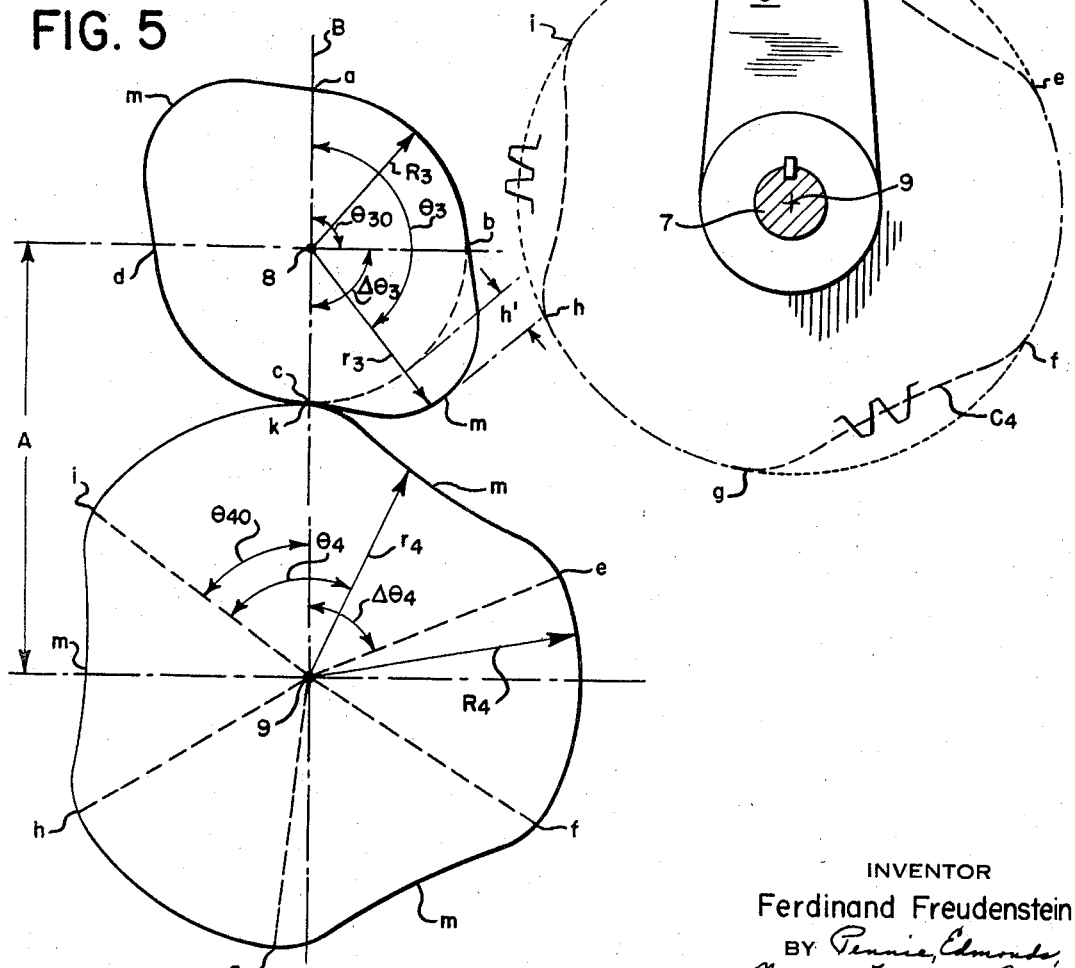
INVENTOR
Ferdinand Freudenstein
BY Pennie, Edmonds,
Morton, Taylor and Adams
ATTORNEYS INVENTOR
Ferdinand Freudenstein Arm Rotation Degrees ⟶

United States Patent Office 3,424,021
Patented Jan. 28, 1969

3,424,021
INTERMITTENT MOTION MECHANISM EMPLOYING NON-CIRCULAR GEARS
Ferdinand Freudenstein, 3720 Independence Ave., Bronx, N.Y. 10463
Filed May 23, 1967, Ser. No. 640,567
U.S. Cl. 74—394            4 Claims
Int. Cl. F16h *35/02, 55/04, 27/08*

ABSTRACT OF THE DISCLOSURE

There is disclosed an intermittent motion mechanism comprising an epicyclic gear train including two pairs of coaxial gears, the gears of one pair functioning as planet gears. The planet gears are fast to each other and are supported on and for rotation with respect to an arm rotating about the axis of the other gears. Each planet gear meshes with a separate one of the other gears and at least one of the pairs of meshing gears includes on each gear thereof one or more circular portions as to which the pitch axis coincides with the pitch axis of the other pair of meshing gears, and one or more non-circular portions along which the pitch axis is displaced from the pitch axis of the other pair of meshing gears.

BACKGROUND OF THE INVENTION

Field of the invention

This invention pertains to intermittent motion mechanisms of the type in which a continuous rotation applied to one member of a linkage produces an intermittent rotation of another member of that linkage. It also pertains to differential gearing since an epicyclic gear train, including non-circular gears therein, is employed in accordance with the invention to obtain an intermittent motion.

The prior art

The external geneva mechanism is a mechanism long known in which a continuous rotation applied to one member of a linkage produces an intermittent, unidirectional rotation of another member of that linkage. The external geneva mechanism has however a number of limitations including the following:

(a) A means which is separate from the driving pin is required for locking the output member during the dwell phase of the motion. Accurate manufacture and careful design are required, in order to effect a smooth transition from rest to motion and vice versa.

(b) The kinematic characteristics of the geneva are not favorable for high-speed operation, except when the number of stations (i.e. the number of slots in the output member) is large. For example, there is a sudden change of acceleration of the output member at the beginning and end of each indexing operation.

(c) There is relatively little flexibility in the design of the geneva mechanism, in consequence of the fact that in the standard geneva only one number (the number of slots in the output member) determines the characteristics of the motion. As a result, the ratio of motion to dwell times cannot exceed one half, the output motion cannot be uniform for any finite portion of the indexing cycle, and is always opposite in sense to the sense of input rotation. The output shaft is moreover always offset from the input shaft.

Many modifications of the standard external geneva have been proposed, including multiple and unequally spaced driving pins, double rollers, and separate entrance and exit slots. These proposals have however been only partly successful.

It has already been proposed (cf. U. Olsson, Acta Polyt. 135, 1953 (Stockholm) pp. 159-160) to utilize non-circular gears in a differential mechanism in order to obtain variable velocities. So far as I am aware however, it has not been heretofore proposed to construct a differential mechanism with non-circular gears so as to obtain an intermittent motion with a finite, non-zero dwell time.

Summary of the invention

It is an object of the invention to provide an improved intermittent motion mechanism. This object is achieved in accordance with the invention by employing, in a differential mechanism or epicyclic gear train, a plurality of non-circular gears having pitch curves which are partly circular and partly non-circular, the circular portions of the pitch curves cooperating with the remainder of the mechanism to provide a dwell time or stationary phase or phases for the output member while the non-circular portions cooperate with the remainder of the mechanism to provide a motion phase or phases for the output member.

Brief description of the drawing

The invention will now be further described in terms of a non-limitative exemplary embodiment thereof and with reference to the accompanying drawings, in which:

FIG. 1 is a vertical axial section though an embodiment of the invention, the arm which supports the planetary gears being assumed to be vertical;

FIG. 2 is a view in side elevation of the apparatus of FIG. 1, taken in the direction indicated by the arrow in FIG. 1, but shown at an enlarged scale, and with the pitch curves of the gears substituted for a showing of their teeth about all but a small fraction of their peripheries;

FIG. 5 is a diagram useful in explaining the invention; and

Description of the preferred embodiment

Figure 3:
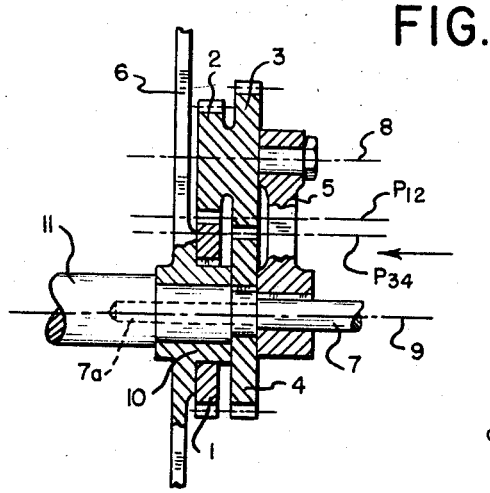
FIG. 3 is a view similar to that of FIG. 1 but showing the gears thereof in a different assumed mesh relation.

Referring to FIGS. 1 to 4, there is shown a gear 4 mounted for rotation about an axis 9 with respect to a frame 6, and a gear 1 coaxial with the gear 4. The gear 1 is shown fixed to the frame (being keyed to a stub shaft 10 of the frame) but it may be mounted to be rotatable with respect to that frame as well as with respect to the gear 4. An arm 5 is mounted to rotate coaxially of the gears 1 and 4. In the embodiment illustrated, arm 5 is keyed to a shaft 7 which is journaled at a reduced portion 7a coaxially in a shaft 11 to which the gear 4 is keyed. Shaft 11 is rotatably mounted with respect to frame 6, coaxially of axis 9.

A uniform rotation applied to the shaft 7, i.e. to the arm 5, will produce a discontinuous rotation of gear 4 and hence of shaft 11, as will be presently explained.

The arm 5 carries two coaxial gears 2 and 3, rotatable with respect to that arm about an axis 8 parallel to axis 9. The gears 2 and 3 are fixed with respect to each other, and mesh with gears 1 and 4 respectively.

Gears 1 and 2 are circular spur gears, while gears 3 and 4 are non-circular spur gears, having pitch curves which include circular portions coincident with the circular pitch curves of gears 2 and 1 respectively, and non-circular portions which depart from the circular pitch curves of gears 2 and 1. The term "circular gear" is used to denote a gear whose pitch surface is a circular cylinder coaxial with the axis of rotation of the gear. Conversely, a non-circular gear is one whose pitch surface is not a circular cylinder coaxial with the axis of rotation of the gear.

The pitch surfaces of two meshing spur gears are the two imaginary cylindrical surfaces, one on each gear, which are in rolling contact and which, assuming an adequate coefficient of friction, would suffice to transmit rotation from one gear to the other without teeth thereon. Hence the pitch surfaces are sometimes called friction surfaces. For circular gears, the pitch surfaces are circular cylinders coaxial in the axes of rotation of their respective gears. The gear teeth may be imagined as being "mounted" on the pitch surfaces to secure positive drive from the driving to the driven gear of each pair of two meshing gears. The line of contact of the pitch surfaces of two meshing spur gears may be called their pitch axis. It is parallel to the parallel axes of rotation of the two gears. The projection of the pitch surface of a gear onto the plane of rotation of the gear, i.e. onto a plane perpendicular to the axis of rotation of the gear, is called the pitch curve of the gear. For a circular gear, the pitch curve is a circle.

In the embodiment of the invention illustrated in FIGS. 1 to 4, the pitch axis of gears 1 and 2 will be identified as $P_{12}$, while that of the meshing gears 3 and 4 will be identified as $P_{34}$.

Figure 4:
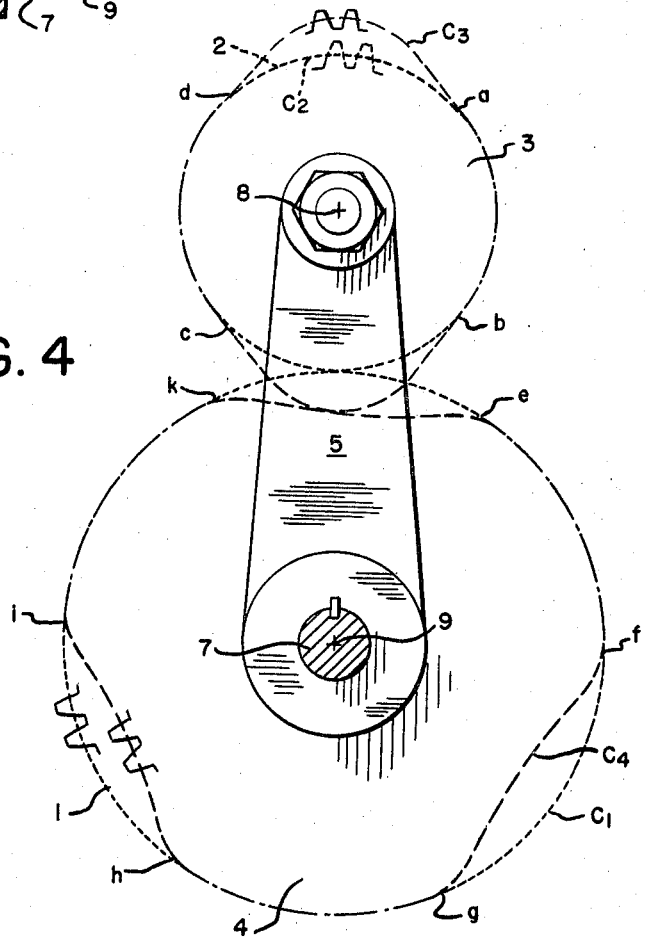
FIG. 4 is a view in side elevation of the apparatus of FIG. 3, taken in the direction indicated by the arrow in FIG. 3, but shown at an enlarged scale, and again showing pitch curves in place of teeth.

In FIGS. 2 and 4, the pitch curves of gears 1 to 4 are indicated at $C_1$ to $C_4$ respectively. Curves $C_1$ and $C_2$ are circles, and are shown in dotted lines where they are distinct from curves $C_3$ and $C_4$. Curves $C_3$ and $C_4$ are shown as dashed lines where they are distinct from curves $C_2$ and $C_1$. Where curves $C_1$ and $C_4$ overlap, they are shown in dot-dash line, as are curves $C_2$ and $C_3$ where they overlap.

In FIGS. 1 and 2, the pitch axes $P_{12}$ and $P_{34}$ coincide due to the fact that those figures show gears 3 and 4 in mesh on circular portions thereof. In FIGS. 3 and 4, the gears 3 and 4 are in mesh on non-circular portions thereof. Consequently their pitch axis $P_{34}$ no longer coincides in FIGS. 3 and 4 with the pitch axis $P_{12}$.

Gear 1 may be regarded as a sun gear, with gear 2 rolling externally around gear 1 and carrying gear 3 integrally with it.

The motion of gear 4 (e.g. with respect to frame 6) is a differential motion, comprising the algebraic sum of the rotation of gear 4 with arm 5 and the rotation of gear 4 relative to arm 5.

In particular, for a set of four circular gears I, II, III, IV disposed with respect to each other as are the gears 1, 2, 3 and 4 respectively of FIG. 1 (i.e. assuming gears 3 and 4 as well as 1 and 2 to be circular), the ratio of the angular velocity of gear IV with respect to gear I to the angular velocity of arm 5 with respect to gear I is $1-T_I T_{III}/T_{II} T_{IV}$, the quantities $T_I$, $T_{II}$, $T_{III}$, $T_{IV}$ being the numbers of teeth on the gears I, II, III and IV respectively.

More generally, and without restriction of the gears to circular shape, if the radii of the pitch curves of gears 1, 2, 3 and 4 of FIGS. 1 to 4 at their points instantaneously in mesh are denoted $r_1$, $r_2$, $r_3$ and $r_4$, then the ratio of the angular velocity of gear 4 with respect to gear 1 to the angular velocity of arm 5 with respect to gear 1 is $1-r_1 r_3/r_2 r_4$. Thus, in the case in which $$r_1/r_2 = r_4/r_3$$

gear 4 remains stationary with respect to gear 1.

In accordance with the invention, at least one pair of meshing gears is made non-circular, with pitch curves in the form of closed single turn curves, made up of at least one circular arc coaxial with the axis of rotation of the gear and at least one arc not so circular. These non-circulr gears are so designed and assembled that, at any time, the portions of the non-circular gears in mesh with each other are either on circular arcs of both gears, or are on non-circular arcs of both gears. The circular arc or arcs of the non-circular gear pair moreover satisfy with the other pair of gears the relation $r_1/r_2 = r_4/r_3$. Moreover, since $r_1+r_2=r_3+r_4$, in view of the fact that gears 1 and 4 are coaxial and gears 2 and 3 are coaxial also, on the circular parts of the gears $r_1=r_4$ and $r_2=r_3$.

When gears 3 and 4 are in mesh on their circular portions, $r_1 r_3/r_2 r_4$ is equal to unity, and the gear 4 is stationary with respect to gear 1. When gears 3 and 4 are in mesh on non-circular portions thereof $r_1 r_3/r_2 r_4$ is not equal to unity, and gear 4 rotates with respect to gear 1. Gear 4 thus undergoes an intermittent motion.

To state the matter in a slightly different way, the angular velocity ratio of gears 3 and 4 (by which is meant the ratio of their angular velocities about fixed centers or, equivalently, with respect to arm 5) has one value when circular portions of gears 3 and 4 are in mesh, and other values when non-circular portions thereof are in mesh. When circular portions of gears 3 and 4 are in mesh, their angular velocity ratio is the same as that of gears 2 and 1, and since gears 2 and 3 have the same angular velocity, gears 1 and 4 must likewise. In contrast, when non-circular portions of gears 3 and 4 are in mesh, their angular velocity ratio must differ from. that of gears 2 and 1, so that gear 4 must have an angular velocity different from that of gear 1.

Moreover with gears 3 and 4 so shaped that, as illustrated in FIGS. 2 and 4, when non-circular parts of gears 3 and 4 are in mesh the pitch axis $P_{34}$ is nearer to axis 9 than the pitch axis $P_{12}$, the intermittent rotation of gear 4 with respect to frame 6 will be in the sense opposite to the rotation of arm 5 with respect to frame 6, assuming gear 1 stationary. If instead the pitch axis $P_{34}$ for the non-circular portions of gears 3 and 4 were nearer the axis 8 than the pitch axis $P_{12}$, then the intermittent rotation of gear 4 would be in the same sense as that of arm 5, again assuming gear 1 to be stationary.

Preferably in accordance with the invention, to avoid changes in the direction of the intermittent rotation of gear 4 with respect to gear 1, the non-circular portions of the pitch curves of gears 3 and 4 always locate the axis $P_{34}$ nearer to axis 9, or else they always locate the axis $P_{34}$, for those non-circular parts, closer to the axis 8. Thus the circular portions of gears 3 and 4, at which $r_3$ and $r_4$ are respectively equal to $r_2$ and $r_4$, constitute locations of either a maximum or a minimum for the ratio of angular velocity of gear 4 to angular velocity of gear 3, these being velocities with respect to arm 5. If the ratio is a maximum, gear 4 will rotate with respect to gear 1 in the same sense as does arm 5. If it is a minimum, gear 4 will rotate with respect to gear 1 in the sense opposite to the rotation of arm 5 with respect to gear 1. FIGS. 1 to 4 illustrate an embodiment in which this ratio is a minimum, so that gear 4 will rotate with respect to gear 1 in a sense opposite to the rotation of arm 5 with respect to gear 1.

It will be seen that in FIGS. 1 and 2 the gears 3 and 4 are in mesh on circular portions of their non-circular or incompletely circular pitch curves $C_3$ and $C_4$, and that consequently the pitch axis $P_{34}$ of the gears 3 and 4 coincides with the pitch axis $P_{12}$ of gears 1 and 2. The drive ratio of gear 3 to gear 4 is consequently the same as that of gear 2 to gear 1, the circular portions of the pitch curves $C_3$ and $C_4$ coinciding respectively with portions of the circular pitch curves $C_2$ and $C_1$. FIGS. 1 and 2 therefore illustrate a relative position of the gears in which gear 4 will be stationary with respect to gear 1.

In FIGS. 3 and 4, in contrast, gears 3 and 4 are in mesh at non-circular portions of their pitch curves $C_3$ and $C_4$, and the ratio of the effective radius of gear 3 to the effective radius of gear 4 is larger for the mesh condition of FIGS. 3 and 4 than in the case of FIGS. 1 and 2. The pitch axis $P_{34}$ is seen in FIGS. 3 and 4 to be on the side of pitch axis $P_{12}$ adjacent the axis 9 of the sun gear 1. In FIGS. 3 and 4 the circular gears 1 and 2 continue in mesh at their circular pitch curves $C_1$ and $C_2$. Hence, for the position of the gears shown in FIGS. 3 and 4, gear 4 will rotate with respect to gear 1.

FIGS. 1 to 4 illustrate an embodiment of the invention in which the non-circular gear 3 and more particularly its pitch curve $C_3$ (FIGS. 2 and 4) has two identical lobes *abc* and *cda*. Each lobe includes a circular portion (*ab* for lobe *abc*, *cd* for lobe *cda*) and a non-circular portion (*bc* for lobe *abc* and *da* for lobe *cda*). Gear 4 has three identical lobes *efg*, *ghi* and *ike*, including circular portions *ef*, *gh* and *ik* respectively, and non-circular portions *fg*, *hi* and *ke* respectively.

While the lobes on each of gears 3 and 4 are identical, the invention is not limited to any such arrangement. On the contrary, provided the numbers of lobes on the two gears are properly chosen, successive lobes may be different, giving a plurality of different motion times and dwell times for the output gear.

The non-circular gears 3 and 4 may be designed in accordance with the following considerations, reference being made to FIG. 5 which is a diagram showing the pitch curves $C_3$ and $C_4$ of gears 3 and 4 for the same position of mesh of those gears as illustrated in FIG. 2.

In FIG. 5, the distance $A$ is the separation of the axes 8 and 9 of FIGS. 1 to 4 and $B$ is the line joining the centers of the pitch curves $C_3$ and $C_4$. $R_3$ and $R_4$ are the radii of those curves on their circular portions, while $r_3$ and $r_4$ are their radii generally, $r_3$ and $r_4$ like $R_3$ and $R_4$ having their centers at the centers of rotation of gears 3 and 4 on axes 8 and 9.

Let $\theta_{30}$ denote the angle subtended at the axis 8 of gear 3 by either of its circular arcs, such as the arc *ab*, and let $\Delta\theta_3$ denote the angle subtended there by either of the non-circular arcs such as *bc*. Let $\theta_3$ denote the polar angle measured from the radius to point *a* to the radius $r_3$. Similarly let $\theta_{40}$ denote the angle subtended at the axis 9 of gear 4 by a circular arc of gear 4 such as *ik*, $\Delta\theta_4$ the angle subtended there by a non-circular arc of gear 4 such as *ke*, and let $\theta_4$ denote the polar angle from the radius to point *i* to radius $r_4$. For simplicity in description of the motions it will be assumed that the gear 1 is fixed with respect to frame 6.

First, select the number of lobes $L_3$ and $L_4$ on the gears 3 and 4. In the embodiment of FIGS. 1 to 4, $L_3=2$ and $L_4=3$. Any two lobes on the two gears (i.e. any two lobes of which one is on one gear and the other on the other) which are to mesh together must have the same arc length. With $L_3=2$ and $L_4=3$, every lobe on gear 3 must mesh with every lobe on gear 4 and vice versa. Hence the lobes on gear 3 are identical to each other, and the lobes on gear 4 are identical to each other. Therefore, $T_3/T_4=L_3/L_4=2/3$, $T_3$ and $T_4$ being the numbers of teeth on gears 3 and 4. $T_1$ and $T_2$ will denote the numbers of teeth on gears 1 and 2.

Secondly, select the ratio $S$ of the time of motion of gear 4 to its dwell time, assuming a uniform rotation of arm 5. For the gears 3 and 4 shown in FIGS. 1 to 4, $S=1$. Evidently $$(\theta_{30}+\Delta\theta_3)L_3=360° \quad (1)$$

and $$S=\Delta\theta_3/\theta_{30} \quad (2)$$

Hence $$\theta_{30}(1+S)L_3=360°$$

For $S=1$ and $L_3+2$, $$\theta_{30}=90° \quad (3)$$

Also, $$\Delta\theta_3=90° \quad (4)$$

and $$(\theta_{40}+\theta_4)L_4=360° \quad (5)$$

$$\theta_{30}/\theta_{40}=(1-\mu)/\mu=5/3 \quad (6)$$

for a value of 3/8 for the quantity $\mu$ of Equation 11 below.

Hence, $$\theta_{40}=54° \quad (7)$$

$$\Delta\theta_4=66° \quad (8)$$

Next, select a convenient profile for the non-circular portion of gear 3. One such profile, used in the design of the gear 3 whose pitch curve is shown in FIG. 5 and which has favorable high-speed characteristics, is $$r_3=R_3\left[1+\frac{\lambda}{2}\left(1-\cos\frac{2\pi(\theta_3-\theta_{30})}{\Delta\theta_3}\right)\right]; \theta_{30}\leq\theta_3\leq(\theta_{30}+\Delta\theta_3) \quad (9)$$

The profile defined by Equation 9 has among others the property that at the transition from rest to motion and vice versa, the gear 4 has zero acceleration for uniform rotation of the arm 5.

Evaluation of Equation 9 for a sufficient number of values for $\theta_3$ within its limits $\theta_{30}$ and $\theta_{30}+\Delta\theta_3$ gives the profile of the non-circular portion of one lobe. Hence the complete pitch curve of gear 3 is determined.

In Equation 9, $\lambda$ is the quantity which, when multiplied by $R_3$, give the maximum or peak value of $r_3-R_3$ differing by an amount $h'$ (FIG. 5) from the radius $R_3$ of the circular portions of the gear. The non-circular portions of each lobe are, moreover, symmetrical about their midpoints, the midpoint being indicated at *m* in FIG. 5.

To evaluate the quantity $\lambda$ in Equation 9 note is taken of the fact that, in order for the pitch curves of gears 3 and 4 to be single turn closed curves, it is necessary that when gear 3 has rotated through one lobe with respect to arm 5, gear 4 shall have rotated through one of its lobes with respect to arm 5. Mathematically, this condition leads to the equation $$\lambda\frac{1-\mu}{\mu}\frac{[S+\alpha-(1+\alpha)u][\alpha-S-(1+\alpha)u]}{[\alpha-(1+\alpha)u]^2} \quad (10)$$

wherein $$\mu=\frac{R_3}{A}=R_3/(R_3+R_4) \quad (11)$$

and $$\alpha=S+(1+S)L_3/L_4 \quad (12)$$

To evaluate Equation 10, there is selected a suitable value for $\mu$ which should be a reasonably simple rational fraction, i.e. a fraction whose numerator and denominator are reasonably small integral numbers. Moreover, $\mu$ should be chosen so that $\lambda$ is sufficiently small in order to keep the angle of obliquity and the curvature of the pitch curves within reasonable limits. By angle of obliquity is meant the angle between the line of centers $B$ of gears 3 and 4 and the common normal to the pitch curves $C_3$ and $C_4$ at their point of tangency, i.e. at the pitch axis $P_{34}$ of those gears. In the gears illustrated in FIGS. 1 to 4, $\alpha=7/3$ and $\mu$ has been selected at 3/8 (i.e. desirably a value near to $L_3/(L_3+L_4)$, which is here 2/5. This gives $\lambda=125/507$.

With selected values for $\theta_{30}$ and $\Delta\theta_3$ (consequent upon selected values for $L_3$ and $S$) and with $\lambda$ evaluated for selected values of $\mu$ and $\alpha$ (the latter depending on $L_4$ as well as $L_3$ and $S$), the profile of gear 3 is determined by Equation 9, and the profile of gear 4 is determined thereby also.

Since gears 1 and 2 have constant radii $R_1$ and $R_2$ respectively equal to $R_4$ and $R_3$ and since $T_1/T_2=R_1/R_2$, $T_1/T_2=R_4/R_3$. Moreover, $A=R_3+R_4$. This means, from the definition of $\mu$ in Equation 11, that $$T_1/T_2=(1-\mu)/\mu \quad (13)$$

Also, since lobes on gears 3 and 4 which are to pass in mesh with each other must have the same arc lengths $$T_4/T_3=L_4/L_3 \quad (14)$$

Hence the values of the ratios $T_1/T_2$ and $T_4/T_3$ are known even without actual computation of suitable numbers of teeth for the gears.

It can easily be shown that each indexing cycle is completed during a fraction of a rotation of arm 5 given by $T_2/T_1L_3$, and in the course thereof the gear 4 is advanced by $1/L_4(T_2L_4/T_1L_3-1)$ turns. For the gears shown, this advance is opposite to that of arm 5.

With $\mu=3/8$, $T_2/T_1=3/5$ so that $T_2/T_1L_3=3/10$ and $1/L_4(T_2L_4/T_1L_3-1)=-1/30$. Thus with the values of $L_3=2$, $L_4=3$, $S=1$, and $\mu=3/8$, each indexing cycle is completed in 108° rotation of arm 5, in the course of which gear 4 rotates through 12° in the opposite direction.

To determine suitable values for the tooth numbers $T_1$, $T_2$, $T_3$, $T_4$, note that the arc length $s_3$, say, of gear 3 is $T_3$ multiplied by the circular pitch $C.P._{34}$ of gears 3 and 4, i.e. by the circular pitch of the circular portions thereof. That is, $s_3 = T_3 C.P._{34}$. This circular pitch is equal to $\pi/D.P._{34}$ wherein $D.P._{34}$ is the diametral pitch of the cutter for cutting of gears 3 and 4. The diametral pitch for a gear is the number of teeth on the gear divided by its pitch diameter, i.e. by the diameter of its pitch circle, and may be regarded as the reciprocal of the fraction of the pitch diameter allocated to one tooth. Let $s_3 = \epsilon A$ wherein A is the center distance between the gears, i.e. the spacing of axes 8 and 9, and $\epsilon$ is a constant of proportionality determined graphically or by computation. Then $$T_3 = \epsilon A/C.P._{34} = \epsilon A D.P._{34}/\pi \quad (15)$$

Also, $$T_4 = T_3 L_4/L_3 \quad (14)$$

As to the circular gears 1 and 2, $$T_1 + T_2 = 2A D.P._{12} \quad (16)$$

in which $D.P._{12}$ is the diametral pitch of the cutter for gears 1 and 2, equal to $\pi$ times the reciprocal of their circular pitch $C.P._{12}$. From Equation 13, Equation 16 yields $$T_1 = 2A(1-\mu)D.P._{12} \quad (17)$$

and $$T_2 = 2A\mu D.P._{12} \quad (18)$$

With $\mu=3/8$, $T_2/T_1=3/5$ so that $T_2/T_1L_3=3/10$ and a standard value. Then A is selected so that $T_3$ and $T_4$ are convenient integers. Then $D.P._{12}$ is selected so that $T_1$ and $T_2$ are as nearly as possible integers.

A design for a set of gears as illustrated in FIGS. 1 to 4, employing for gear 3 the profile of Equation 9 and with $S=1$, $L_3=2$, $L_4=3$, $\mu=3/8$, $\epsilon=2.56321$ (i.e. $s_3=2.56321\ A$), $D.P._{34}=32$, $D.P._{12}=32$, and with A selected at 2.37469 inches yields tooth numbers as follows:

$T_1=95$
$T_2=57$
$T_3=62$
$T_4=93$

Figure 6A:
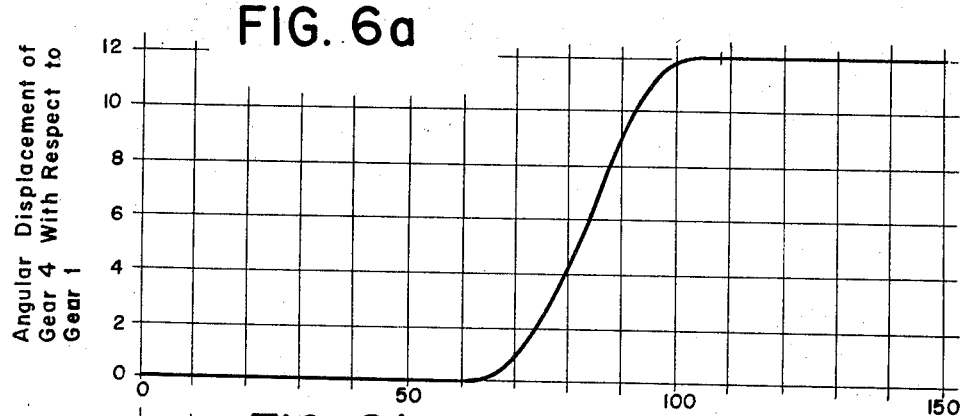
FIG. 6 is a series of curves illustrating certain properties of an embodiment of the invention as illustrated in FIGS. 1 to 4.
Figure 6B:
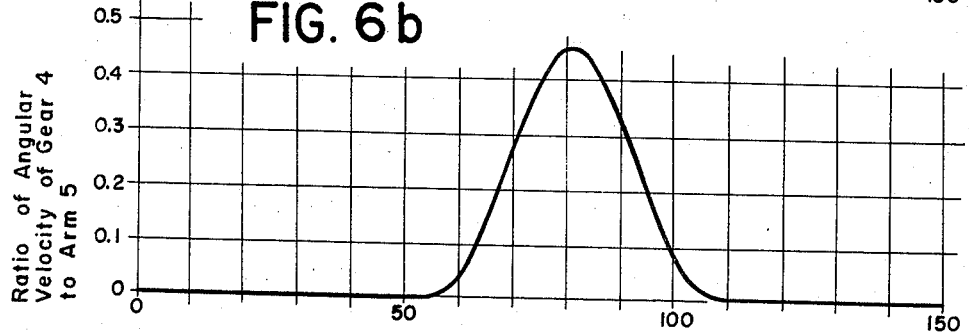
Figure 6C:
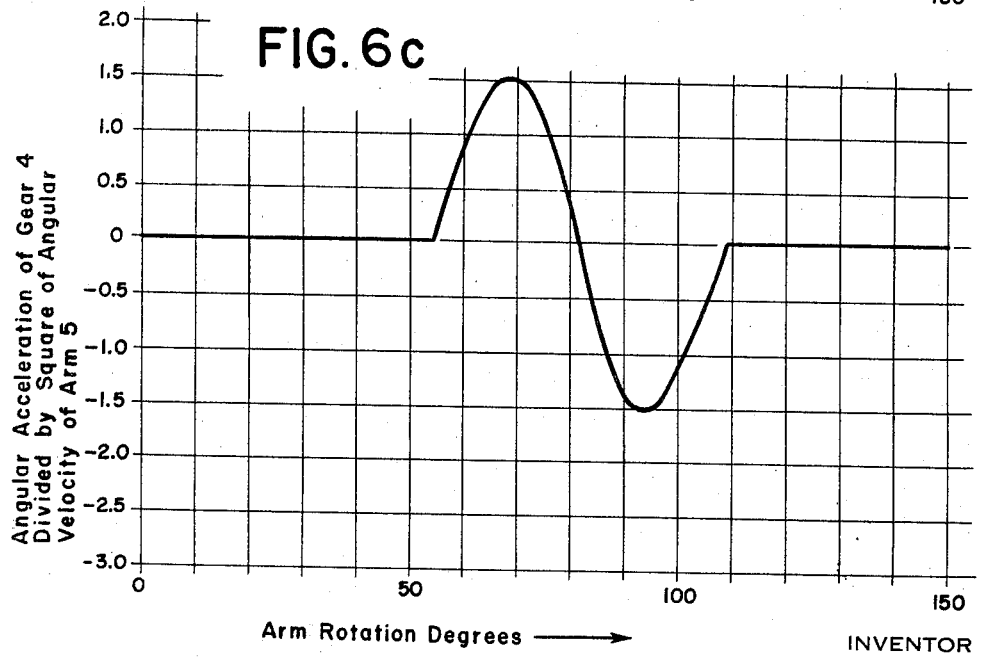

For the design data developed hereinabove, FIG. 6a shows, plotted vertically, the displacement of gear 4 with respect to gear 1 as a function of the rotation of arm 5 with respect to gear 1, plotted horizontally. Gear 4 is seen to rotate, in a discontinuous fashion, through 12° while arm 5 rotates through 108°. This rotation of gear 4 is opposite to the rotation of arm 5. FIG. 6b similarly shows, to the same scale of abscissae, the ratio of the angular velocity of gear 4 to that of arm 5 and FIG. 6c shows, again to the same scale of abscissae, the ratio of the angular acceleration of gear 4 divided by the square of the angular velocity of arm 5. It will be seen that the indexing cycle occupies 108° of rotation of the arm 5. FIG. 6a shows that in the course of this indexing cycle, the gear 4 rotates backwardly through 12° with respect to gear 1.

A large number of other choices for S, $L_3$, $L_4$, and the ratio of $R_3$ to $R_4$ are possible. With circular gears 1 and 2 and non-circular gears 3 and 4 a 72° advance of gear 4 per index, occuring during four-fifths of a turn for the arm 5, are obtained for $S=1$, $L_3=1$, $L_4=1$, $\mu=4/9$ and $R_3/R_4=4/5$. If instead, $S=1$, $L_3=2$, $L_4=1$, $\mu=5/8$ and $R_3/R_4=5/3$, the gear 4 will advance 60° per index during five-sixths of a turn of the arm 5, the advance being again in the direction opposite to that of the rotation of arm 5. In both of these modifications the lobes on each gear are identical.

These are only two of an infinite number of combinations of choices additional to that hereinabove discussed in detail.

Among the advantages of the invention are the following:

(a) The gear teeth serve to lock the output member during the dwell as well as to drive that member during motion.

(b) Superior high-speed characteristics are obtainable. The profiles of the pitch curves of the non-circular gears can be tailored to a wide variety of desired kinematic and dynamic characteristics. There need be no sudden terminal acceleration change of the driven member, so that the transition from dwell to motion and vice versa, will be smooth.

(c) The ratio of motion to dwell time is adjustable within wide limits. It can exceed unity, if desired.

(d) The direction of rotation of the output member can be in the same or in the opposite sense to that of the input member, according as the pitch axis $P_{34}$ for the non-circular portions of gears 3 and 4 lies wholly outside or wholly inside the pitch surface of the sun gear 1.

(e) Rotation of the output member can be coaxial with the input rotation.

(f) The velocity variation during motion is adjustable within wide limits. Uniform output velocity for part of the indexing cycle is obtainable; by varying the number and shape of the lobes, a variety of other motion characteristics can be obtained.

(g) The flexibility of the design is broad, since the motion characteristics are determined by the design of the pitch curves. These involve the choice among an infinite set of coordinates, rather than just one, or a few.

(h) The number of indexing operations per revolution of the input member can exceed unity. Referring to FIGS. 1 and 4, if gears 3 and 4 have an equal number of identical lobes, say L, then for a given indexing rate, I/min., the arm speed is very roughly I/L r.p.m., while the speed of gears 2 and 3 is very roughly 2I/L r.p.m. If L is greater than 2, then all members except the driven gear, rotate at substantially lower speed in r.p.m. than the indexing rate per minute. This is an advantage at high speeds.

(i) The mechanism is compact and has relatively few moving parts, which can be readily dynamically balanced. It is adaptable for mass production.

The invention may be expected to find application in the arts of packaging, production, automatic transfer, and processing, and, more generally, wherever equipment is to be moved intermittently.

Numerous modifications may be made to the structure hereinabove disclosed and described in detail to adapt the performance of the intermittent motion mechanism of the invention to specific needs. For example, it is possible to change the phase by an adjustment of the rotational position of the sun gear 1 in FIGS. 1 to 4. It is also possible to have an oscillating output motion with a wide variety of characteristics, by designing the pitch axis $P_{34}$ for the non-circular portions of the gears 3 and 4 to lie both inside and outside the pitch surface of the sun gear 1. When all four gears of FIG. 1 are non-circular, but pairwise identical (1 and 4; 2 and 3), a change of phase of the angular position of gear 2 relative to gear 3 produces a variable oscillation output motion, ranging from zero to a maximum. These examples are merely illustrative. Although illustrated with respect to just one type of differential gear mechanism, the invention is applicable to differential gear mechanisms generally, including those which may involve gears other than spur gears.

While the invention has been hereinabove described in terms of a presently preferred embodiment thereof, it is not limited thereto. Thus it is not limited to the particular gear shapes shown nor is it limited even to the particular form of epicyclic gear train shown. The essential characteristic of the invention producing an intermittent motion of an output member with non-zero dwell times therefor is the provision, in an epicyclic gear train employing constant velocity ratio gears and having an output member of zero velocity, of a least one pair of gears departing from a constant velocity ratio over a portion of their periphery so as to impart over a part but only a part of their mesh an output motion to that output member. With the type of epicyclic gear train which has been shown, the essential characteristic of the invention is the provision of first and second gears in mesh with each other and of third and fourth gears in mesh with each other, and of means mounting those gears in an epicyclic gear train in which the second and third gears are coupled together, the gears having pitch curves which for one part of their periphery satisfy and for another part of their periphery do not satisfy the relation $r_1/r_2 = r_4/r_3$, wherein $r_1$ to $r_4$ are respectively the radii of the first through fourth gears mentioned at their points of mesh, i.e. at the points of instantaneous contact between the pitch curves of the two pairs of meshing gears. When the relation $r_1/r_2 = r_4/r_3$ is satisfied, the fourth gear is stationary with respect to the first gear and when the relation is not satisfied, the fourth gear rotates with respect to the first gear. Obviously the gears may be numbered in either order.

Even with the type of epicyclic gear train shown comprising two pairs of coaxial gears rotating about parallel axes, it is not necessary that any of the four gears have pitch curves including circular arcs. With such as embodiment, in which none of the four gears include any circular arcs on their pitch curves, intermittent motion with non-zero dwell times will be obtained if in each pair of coaxial gears the pitch curves of the two gears are in part coincident and in part non-coincident.

More generally, the invention comprises all modifications on and departures from the embodiment hereinabove described, properly falling within the spirit and scope of the appended claims.

I claim:
1. An intermittent motion mechanism comprising first and second gears in mesh with each other, third and fourth gears in mesh with each other, and means mounting said gears in an epicyclic gear train with said second and third gears coupled for rotation together at the same angular velocity, said gears having pitch curves which over one part of their periphery satisfy and over another part of their periphery do not satisfy the relation $r_1/r_2 = r_4/r_3$, wherein $r_1$ to $r_4$ are respectively the radii of said first to fourth gears at their points of mesh.

2. An intermittent motion mechanism comprising means defining two parallel axes of rotation at a fixed separation, a first pair of gears rotatably supported with respect to said means for rotation about one of said axes, a second pair of gears rotatably supported with respect to said means for rotation about the other of said axes, the gears of one of said pairs being fixed with respect to each other, each gear of said first pair being in mesh with a separate gear of said second pair, the gears of each of said pairs having pitch curves in part coincident and in part non-coincident.

3. An intermittent motion mechanism comprising a sun gear, a planet gear in mesh with said sun gear, means mounting said sun and planet gears in an epicyclic gear train, a third gear coaxial with and pinned to said planet gear, and a fourth gear supported coaxially of said sun gear in mesh with said third gear, the gears of at least one of said pairs of meshing gears having each a pitch curve including a circular arc coaxial with the center of that pitch curve and an arc not circularly coaxial with the center of that pitch curve, the circularly coaxial pitch curve arcs of coaxial ones of said gears having the same radius.

4. An intermittent motion mechanism according to claim 2 wherein one gear of said first pair and the gear of said second pair in mesh with said one gear both have circular pitch curves.

References Cited

UNITED STATES PATENTS

| | | | |
|---|---|---|---|
| 1,409,900 | 3/1922 | Adams | 74—394 |
| 1,818,555 | 8/1931 | Helland | 74—394 X |
| 2,296,892 | 9/1942 | Andrew | 74—394 |
| 2,655,817 | 10/1953 | Armelin | 74—394 |
| 3,076,351 | 2/1963 | Moss | 74—394 |

DONLEY J. STOCKING, *Primary Examiner.*

L. H. GERIN, *Assistant Examiner.*

U.S. Cl. X.R.

74—437, 84

UNITED STATES PATENT OFFICE
CERTIFICATE OF CORRECTION

Patent No. 3,424,021                          January 28, 1969

Ferdinand Freudenstein

It is certified that error appears in the above identified patent and that said Letters Patent are hereby corrected as shown below:

Column 6, line 25, "h$'$" should read -- h --; lines 36 and 37, the equation should appear as shown below:

$$\lambda = \frac{1-\mu}{\mu} \frac{[S+\alpha-(1+\alpha)\mu][\alpha-S-(1+\alpha)\mu]}{[\alpha-(1+\alpha)\mu]^2}$$

Column 7, line 43, "With $\mu=3/8$, $T_2/T_1=3/5$ so that $T_2/T_1L_3=3/10$ and" should read -- With equations [14], [15], [17] and [18], $D.P._{34}$ is selected at --. Column 9, line 38, "as" should read -- an --.

Signed and sealed this 24th day of March 1970.

(SEAL)
Attest:

EDWARD M. FLETCHER, JR.                  WILLIAM E. SCHUYLER, JR.
Attesting Officer                           Commissioner of Patents